United States Patent [19]
Viehmann

[11] Patent Number: 6,026,002
[45] Date of Patent: Feb. 15, 2000

[54] CIRCUIT CONFIGURATION FOR SUPPLYING AN ELECTRONIC LOAD CIRCUIT

[75] Inventor: Hans-Heinrich Viehmann, München, Germany

[73] Assignee: Siemens Aktiengesellschaft, Munich, Germany

[21] Appl. No.: 09/163,600

[22] Filed: Sep. 28, 1998

Related U.S. Application Data

[63] Continuation of application No. PCT/DE97/00625, Mar. 27, 1997.

[30] Foreign Application Priority Data

Mar. 28, 1996 [DE] Germany .......................... 196 12 443

[51] Int. Cl.[7] .................................................. H02M 3/18
[52] U.S. Cl. ............................................................ 363/60
[58] Field of Search ........................ 363/59, 60; 307/109, 307/110; 327/536, 530

[56] References Cited

U.S. PATENT DOCUMENTS

| | | | |
|---|---|---|---|
| 4,236,199 | 11/1980 | Stewart | 363/60 |
| 5,159,543 | 10/1992 | Yamawaki | 363/60 |
| 5,301,097 | 4/1994 | McDaniel | 363/60 |
| 5,414,614 | 5/1995 | Fette et al. | 363/59 |
| 5,483,434 | 1/1996 | Seesink | 363/60 |
| 5,499,183 | 3/1996 | Kobatake | 363/59 |
| 5,543,668 | 8/1996 | Fong | 307/110 |
| 5,550,728 | 8/1996 | Ellis | 363/60 |
| 5,625,544 | 4/1997 | Kowshik et al. | 363/59 |
| 5,694,308 | 12/1997 | Cave | 363/59 |
| 5,760,637 | 6/1998 | Wong et al. | 327/536 |
| 5,886,887 | 3/1999 | Jenq | 363/60 |

FOREIGN PATENT DOCUMENTS

| | | |
|---|---|---|
| 0 350 462 A2 | 1/1990 | European Pat. Off. . |
| 2 724 468 | 3/1996 | France . |

OTHER PUBLICATIONS

Patent Abstracts of Japan No. 1–39263 A (Sano), dated Feb. 9, 1989.

*Primary Examiner*—Adolf Deneke Berhane
*Attorney, Agent, or Firm*—Herbert L. Lerner; Laurence A. Greenberg

[57] ABSTRACT

A circuit configuration for supplying an electronic load circuit with an electrical high voltage, whose value has a magnitude greater than a value of a voltage supply that supplies the circuit configuration. The circuit configuration has a pump circuit that is electrically connected to the load circuit and outputs the high voltage to the load circuit on the basis of an internal switching signal which has a predetermined pump frequency. The electrical pump power, which is taken up by the load circuit, of the pump circuit essentially depends both on the value of the supply voltage and on the value of the pump frequency of the switching signal of the pump circuit. The circuit configuration has an electronic control circuit that is assigned to the pump circuit and supplied with a voltage derived at least from the supply voltage of the pump circuit. In dependence on a control signal that depends on the value of the supply voltage, the control circuit emits to the pump circuit a switching signal that acts on the pump frequency for generating the high voltage which is output by the pump circuit in such a way that the value of the pump frequency of the switching signal is inversely proportional to the value of the supply voltage.

15 Claims, 3 Drawing Sheets

CIRCUIT CONFIGURATION FOR SUPPLYING AN ELECTRONIC LOAD CIRCUIT

CROSS-REFERENCE TO RELATED APPLICATION

This is a continuation of copending International Application No. PCT/DE97/00625, filed Mar. 27, 1997, which designated the United States.

BACKGROUND OF THE INVENTION

1. Field of the Invention

The invention relates to a circuit configuration for supplying an electronic load circuit with an electrcial high voltage. The high voltage has a value whose magnitude is greater than a value of a supply voltage that supplies the circuit configuration. The circuit configuration has a pump circuit that is electrically connected to a load circuit. The pump circuit outputs the high voltage to the load circuit on the basis of an internal switching signal that has a predetermined pump frequency in such a way that the electrical pump power of the pump circuit essentially depends both on the value of the supply voltage and on the value of the pump frequency of the switching signal of the pump circuit. For electrically programmable and erasable semiconductor memories, the programming and erasing steps require voltages whose magnitudes exceed the supply voltage that is customary in most memories. The memory cells of electrically programmable and erasable semiconductor memories are usually constructed from two externally drivable electrodes and a floating-potential electrode situated in between. Such memory cells are programmed by applying charges to the floating-potential electrode by applying a high voltage between the two externally drivable electrodes where the voltage is typically about +18 volts. Such memory cells are erased by removing charges from the floating-potential electrode by applying a high voltage that has an opposite sign to the programming voltage and is typically about −12 volts. Important fields in which electrically programmable and erasable semiconductor memories are employed are, in addition to electronic data processing systems, in particular electronic cards such as, for example, memory cards and microprocessor cards. In these cases, the supply voltage is fed externally from a so-called terminal during a data exchange between the electronic card and the terminal. In the field of TTL technology with integrated semiconductor components constructed from bipolar transistors, the supply voltage is usually 5 volts ±10%, whereas in the field of CMOS technology with integrated semiconductor components constructed from field-effect transistors, values of typically 3 volts 10%, are customary. For the fields in which electrically programmable and erasable semiconductor memories are employed, it is therefore desirable to provide a high-voltage generating circuit for voltages of both signs, which operates both with a supply voltage of about 3 volts and with a supply voltage of about 5 volts.

SUMMARY OF THE INVENTION

It is accordingly an object of the invention to provide a circuit configurations for supplying an electronic load circuit which overcomes the above-mentioned disadvantages of the prior art devices of this general type, which can be operated with different supply voltages for the purpose of outputting a constant pump power to the load circuit.

With the foregoing and other objects in view there is provided, in accordance with the invention, in combination with a load circuit and a voltage supply, a circuit configuration for supplying the load circuit with a high voltage having a value greater than a value of the voltage supply supplying the circuit configuration, the circuit configuration including: a pump circuit to be electrically connected to the load circuit and outputting a high voltage to the load circuit; the voltage supply outputting a voltage with the value to the pump circuit; an electronic control circuit connected to the pump circuit and receiving a voltage derived at least from the voltage supply; and a control signal derived in dependence on the value of the voltage supply received by the electronic control circuit, the electronic control circuit in dependence on the control signal emitting a switching signal having a pump frequency to the pump circuit for controlling a generation of the high voltage output by the pump circuit, a value of the pump frequency is inversely proportional to the value of the voltage supply.

According to the invention, it is provided that the circuit configuration has an electronic control circuit that is assigned to the pump circuit and is supplied with a voltage derived at least from the supply voltage of the pump circuit and, depending on a control signal, which depends on the value of the supply voltage, emits to the pump circuit a switching signal which acts on the pump frequency for generating the high voltage. The high voltage is output by the pump circuit, in such a way that the value of the pump frequency of the switching signal is inversely proportional to the value of the supply voltage. The invention is based on the insight of utilizing the dependency of the pump power that is output to the load circuit on the product of the supply voltage and the pump frequency to an extent such that in order to output a pump power which is as constant as possible, even with different supply voltages, the pump frequency is controlled in such a way that it increases as the supply voltage decreases. At the same time, the outlay on circuitry is comparatively low, since only a single control signal, which corresponds to the value of the supply voltage, is necessary for controlling the pump frequency. The pump frequency can thus be controlled exclusively as a function of the value of the supply voltage. Other variables, such as, or example, the power output of the pump circuit or the power consumption of the load circuit, have no significant influence on the pump frequency, with the result that further signals for controlling the pump frequency which depend on variables other than the supply voltage are not necessary.

In a preferred construction of the circuit configuration according to the invention, it may be provided that the pump circuit is controlled by the control signal of the control circuit for the purpose of outputting an at least approximately constant pump power to the load circuit. The pump power output of the pump circuit is controlled by the control circuit to be essentially proportional to the product of the supply voltage value and the pump frequency. In order to keep the pump power of the pump circuit at a constant value, provision may be made for controlling the pump frequency by the value of the supply voltage in such a way that the influence of the supply voltage value on the pump power is compensated for.

Taking account of the proportional relationship between the pump power, on the one hand, and the product of the supply voltage and the pump frequency, on the other hand, it may furthermore be provided that the pump power output of the pump circuit is controlled by the control circuit as a function of the supply voltage value in such a way that the pump frequency is indirectly proportional to the supply voltage value. In the case of a pump circuit having the pump power $P = c*U*f$, where P represents the pump power, c represents an ideally constant factor, U represents the supply voltage and f represents the pump frequency, a control circuit which controls the pump frequency f in accordance with the relationship f=d/U, where d represents an ideal constant, would ideally keep the pump power at a constant value. The following is then produced, therefore, for the dependence of the pump frequency: P=c*d. Given such control of the pump frequency, which is indirectly proportional to the value of the supply voltage, the dependence of the pump power on the supply voltage and the pump frequency can be compensated for. In real circuits, the constants c and d depend, for example, on the temperature or component-specific parameters. This influence can, provided this is deemed necessary, optionally be compensated for by suitable circuitry measures.

In a further preferred construction of the circuit configuration according to the invention, it may be provided that the control circuit for generating and outputting the switching signal has an oscillator circuit whose oscillator frequency is controlled by the control signal present at the input of the oscillator circuit. When the signal generated by the oscillator circuit is used as the switching signal for the pump circuit, the pump frequency is proportional to the oscillator frequency as a result of which the pump frequency is controlled as a function of the control signal.

In order to achieve an indirectly proportional relationship between the supply voltage value and the pump frequency, it may furthermore be provided that the control signal present at the input of the oscillator circuit is derived directly from the supply voltage value. As a result, the value of the pump frequency is controlled directly by the value of the supply voltage.

In a more detailed refinement of the circuit configuration according to the invention, it may be provided that the oscillator circuit has a Schmitt trigger circuit. The frequency of an oscillator circuit having a Schmitt trigger circuit can be controlled in a simple manner by just one voltage, as a result of which the circuit configuration according to the invention can be constructed with a relatively low outlay on circuitry.

For the purpose of further processing the signals output by the oscillator circuit, it may be advantageously provided that the control circuit assigned to the pump circuit has a frequency divider which is connected downstream of the oscillator circuit and switches two mutually antisymmetric clock signals to the two pump inputs of the pump circuit. For satisfactory functioning of the pump circuit, provision may advantageously be made for providing two mutually inverse clock signals, whose high and low levels have the same temporal length. Such clock signals can be provided in a comparatively simple manner by the frequency divider of the circuit configuration according to the invention. The frequency divider can be constructed, for example, from simple gate circuits which are available in most customary semiconductor technologies, such as, for example, in the TTL or CMOS method of construction.

In a further preferred embodiment of the invention, it may be provided that the pump circuit has a cascade circuit that is composed of a plurality of stages including capacitors and transistors operating as diodes. The stages of the cascade circuit are connected in a series circuit between the high-voltage output and the supply voltage in such a way that the transistors operating as diodes are connected in series, and the capacitors that are coupled to the coupling points of the transistors operating as diodes are alternately coupled to the two pump inputs by that end which is remote from the transistors operating as diodes. The pump circuit has a further feedback transistor which is connected between the supply voltage and the series circuit composed of the transistors and is connected by its control input to the supply voltage and operates as a diode. By using feedback transistors operating as diodes, particularly with CMOS technology, the area requirement on the semiconductor substrate can be kept low. A pump circuit of this type can be realized in most customary semiconductor technologies, such as, for example, in the TTL or CMOS method of construction, which ensures the possibility for complete integration on a semiconductor substrate.

In order to ensure a construction which is as compact as possible, it may be advantageously provided that the circuit configuration is formed in an integrated manner together with the load circuit on a semiconductor substrate. The oscillator circuit, the frequency divider and also the cascade circuit can be realized using the same semiconductor technology, thereby enabling production of monolithic circuit components on a single semiconductor substrate.

In a particularly preferred application of the control circuit according to the invention, it may be provided that the electronic load circuit has a group of memory cells of a non-volatile electrically erasable and programmable semiconductor memory which are to be programmed or erased. In this case, it may advantageously be provided that the value of the high voltage is preferably about +18 volts or −12 volts, and the value of the supply voltage is preferably between about +3 volts±10% to +5 volts±10%.

In order to reduce the outlay on circuitry, it may furthermore be provided that the value of the control signal corresponds directly to the value of the supply voltage. By contrast, a transformation circuit between the supply voltage and the control signal would possibly result in a non-linear transfer function between the control signal and the supply voltage, which might disrupt the indirectly proportional relationship between the pump frequency and the supply voltage.

Other features which are considered as characteristic for the invention are set forth in the appended claims.

Although the invention is illustrated and described herein as embodied in a circuit configuration for supplying an electronic load circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
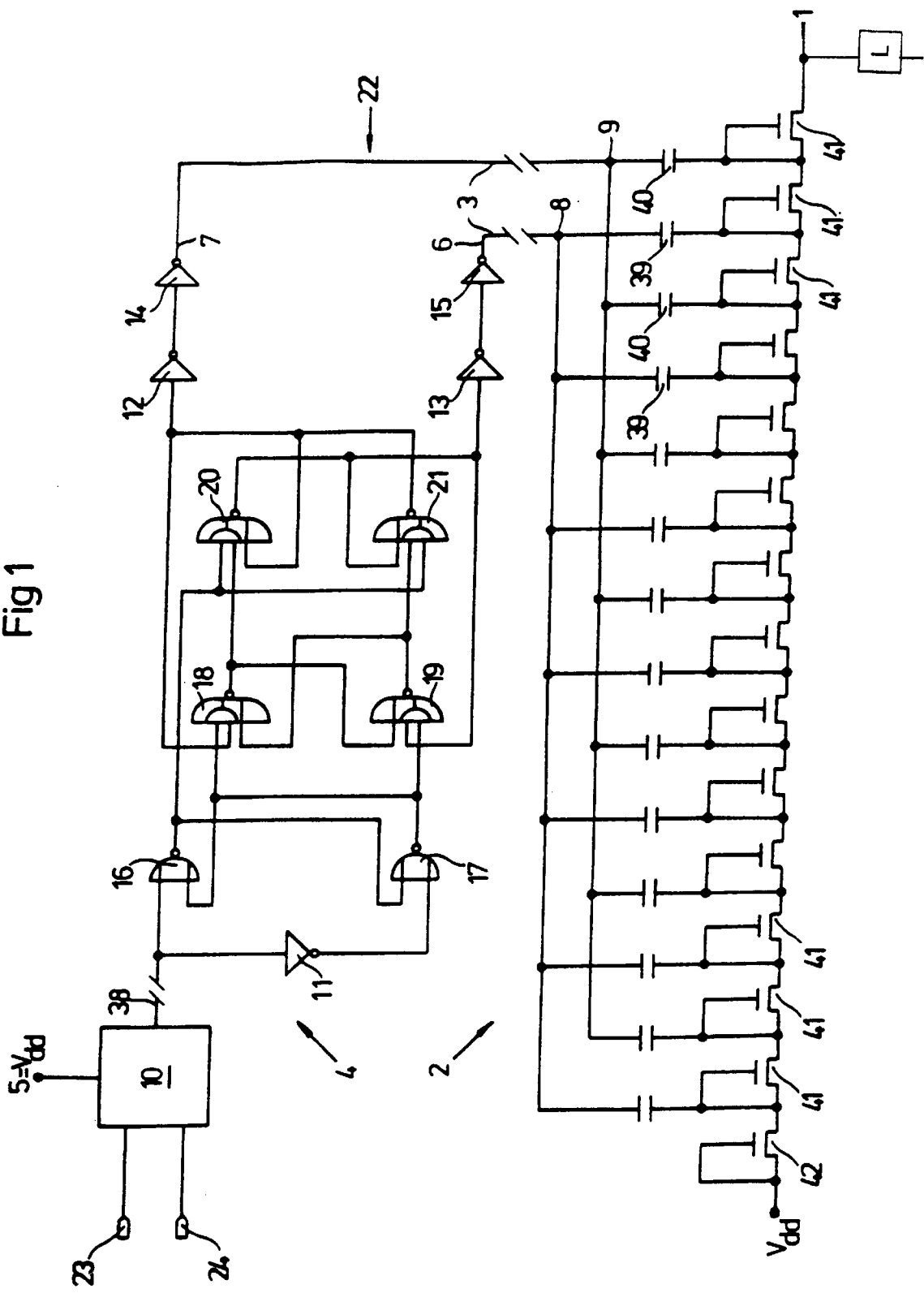
FIG. 1 is a circuit diagram of a circuit configuration according to the invention.

Referring now to the figures of the drawing in detail and first, particularly, to FIG. 1 thereof, there is shown an exemplary embodiment of a circuit configuration according to the invention for supplying an electronic load circuit L. The electronic load circuit L is present at the high-voltage output 1 and is not illustrated in greater detail in FIG. 1. The load circuit L is, supplied with an electrical high voltage whose value has a magnitude greater than the value of a supply voltage $V_{dd}$ that supplies the circuit configuration. The load circuit L may preferably constitute memory cells of an electrically programmable and erasable semiconductor memory that is provided in an electronic memory card or microprocessor card. The circuit configuration has a pump circuit 2 that is connected to the load circuit L. The pump circuit 2 outputs a high voltage of typically +18 volts via the high-voltage output 1 to the load circuit L on the basis of an internal switching signal 3 at a predetermined pump frequency, in such a way that the electrical pump power, which is taken up by the load circuit L, of the pump circuit 2 essentially depends both on the value of the supply voltage $V_{dd}$ and on the value of the pump frequency of the switching signal 3. The circuit configuration has an electronic control circuit 4 that is assigned to the pump circuit 2. The electronic control circuit 4 is supplied with a voltage derived from the supply voltage $V_{dd}$ of the pump circuit 2 and, depending on a control signal 5 that depends on the value of the supply voltage $V_{dd}$, emits to the pump circuit 2 the switching signal 3 which acts on the pump frequency for generating the high voltage which is output by the pump circuit 2, in such a way that the value of the pump frequency of the switching signal 3 is inversely proportional to the value of the supply voltage $V_{dd}$. The control circuit 4 and the pump circuit 2 are coupled to one another via control outputs 6, 7 of the control circuit 4 and pump inputs 8, 9 of the pump circuit 2. In the exemplary embodiment according to FIG. 1, the control signal 5 of the control circuit 4 directly constitutes the supply voltage $V_{dd}$ of the circuit configuration. The control circuit 4 has a Schmitt trigger oscillator 10 and a frequency divider 22 which is connected downstream of the Schmitt trigger oscillator 10 and is constructed from circuit gates 11 to 21.

Figure 2:
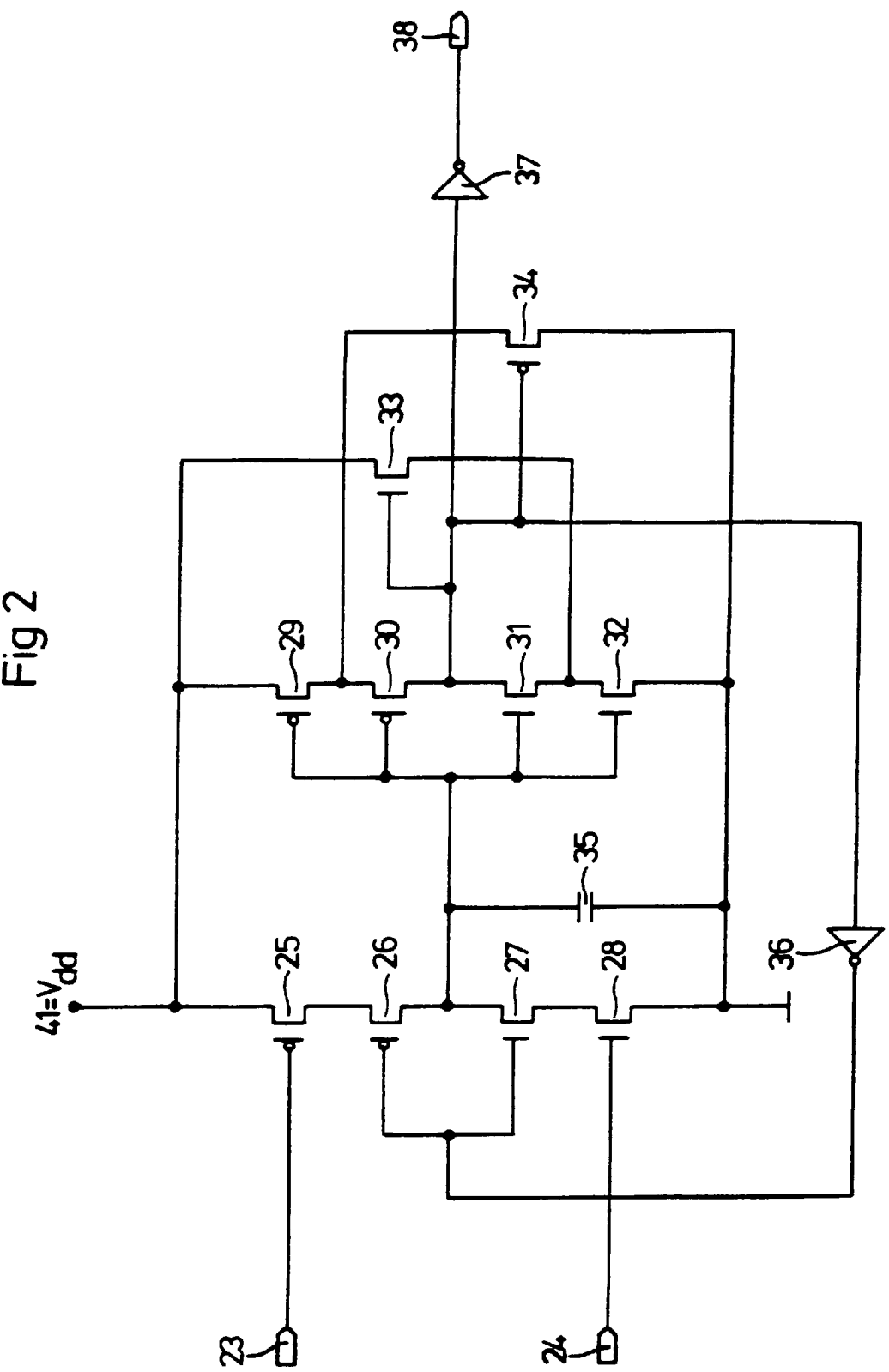
FIG. 2 is a circuit diagram of a Schmitt trigger oscillator circuit.

With reference to FIG. 2, the oscillator circuit 10 has a first reference voltage input 23 and a second reference voltage input 24, at which two constant reference voltages are present for calibrating the circuit configuration. The oscillator circuit 10 furthermore has a series circuit formed of four transistors 25 to 28, two p-channel field-effect transistors 25, 26 and two n-channel field-effect transistors 27, 28, which series circuit is connected between the supply voltage $V_{dd}$ and an earth connection. Connected in parallel with this is a second series circuit formed by four transistors 29 to 32, two p-channel field-effect transistors 29, 30 and two n-channel field-effect transistors 31, 32. The control input of the transistor 25 is coupled to the first reference voltage input 23, and the control input of the transistor 28 is coupled to the second reference voltage input 24. The control inputs of the transistors 26, 27 are connected to one another. The control inputs of the transistors 29 to 32 are coupled to one another and are connected to the coupling point of the two electrodes of the transistors 26, 27. A capacitor 35 is furthermore connected in parallel with the transistors 27, 28. A n-channel field-effect transistor 33 is connected in parallel with the transistors 29 to 31. An p-channel field-effect transistor 34 is connected in parallel with the transistors 30 to 32. The control inputs of the transistors 33, 34 are connected to the coupling point of the transistors 30, 31 and to the inputs of two inverter gates 36, 37. The output of the inverter gate 36 is connected to the common control connection of the transistors 26, 27. The output of the inverter gate 37 corresponds to the output 38 of the oscillator circuit 10.

The oscillator circuit 10 is coupled via the oscillator output 38 to the frequency divider 22. The frequency divider 22, which is formed from the gates 11 to 21, has five inverter gates 11 to 15, two negated OR (NOR) gates 16, 17 and four negated OR gates 18 to 21 which are each preceded by an integrated AND gate, which gates are interconnected in the manner shown in FIG. 1. The first and second control outputs 6, 7 of the control circuit 4 are coupled to the first and second pump inputs 8, 9, respectively, for the purpose of feeding the switching signal 3 to the pump circuit 2. The pump circuit 2 that is constructed from fourteen capacitors 39, 40 and fifteen transistors 41, 42 constitutes a cascade circuit. The cascade circuit is composed of fourteen stages each including one of the capacitors 39, 40 and one of the transistors 41 operating as a diode, which are interconnected in accordance with the illustration according to FIG. 1. The stages of the cascade circuit are in this case connected in a series circuit between the high-voltage output 1 and the supply voltage $V_{dd}$ in such a way that the transistors 41 operating as diodes form a series circuit, and the capacitors 39, 40 which are coupled to the control inputs of the transistors 41 operating as diodes are alternately coupled to the two pump inputs 8, 9 that is remote from the transistors 41. The even-numbered capacitors 39 being connected to the pump input 8 and the odd-numbered capacitors 40 being connected to the pump input 9. The pump circuit 2 has a further feedback transistor 42 that is connected between the supply voltage $V_{dd}$ and the series circuit composed of the transistors 41. The further feedback transistor is connected by its control input to the supply voltage $V_{dd}$ and operates as a diode.

Figure 3:
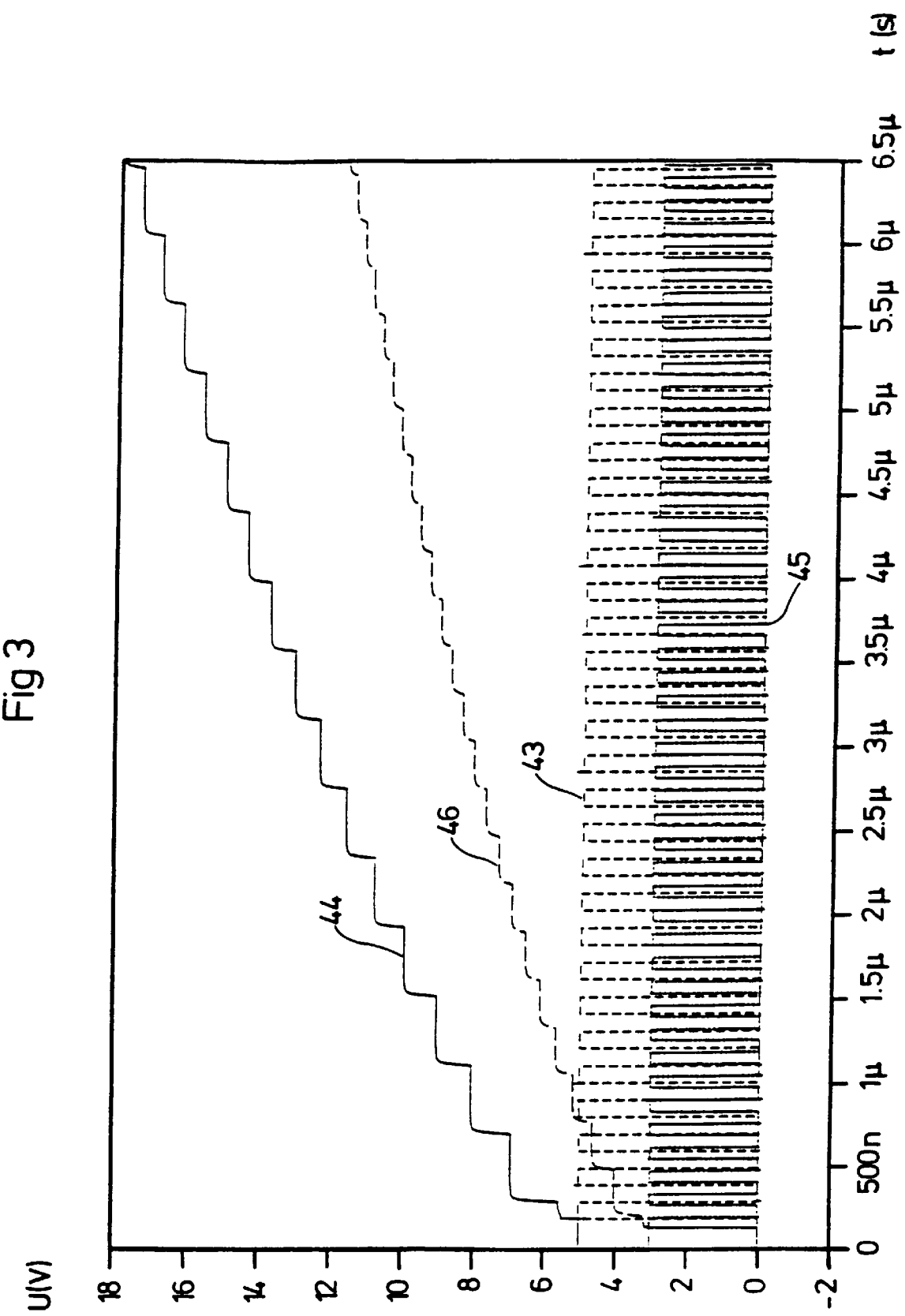
FIG. 3 is a graph of a time profile of a number of voltages of the circuit configuration according to the invention.

FIG. 3 illustrates four diagrams 43 to 46 that show the time profile of a number of voltages of the circuit configuration illustrated in FIGS. 1 and 2. The first curve 43 shows the clock signal which is present at the output 38 and is generated by the oscillator circuit 10 given a supply voltage $V_{dd}$=5 volts and the second curve 44 shows the high voltage which is simultaneously present at the high-voltage output 1. Analogously to this, the curves 45 and 46 respectively show the clock signal present at the output 38 and the high voltage present at the high-voltage output 1 given a supply voltage $V_{dd}$=3 volts.

The method of operation of the circuit configuration illustrated in FIGS. 1 and 2 is explained in more detail below with reference to the voltage profiles shown in FIG. 3. The Schmitt trigger oscillator 10 generates at its output 38 a rectangular-waveform signal 43, 45 whose frequency is controlled indirectly proportionally to the control signal 5, which is identical to the value of the supply voltage $V_{dd}$ of the circuit configuration. As a result of the reference voltages present at the reference voltage inputs 23, 24, the series circuit formed from the transistors 25 to 28 and illustrated in FIG. 2 operates as a current source whose current is proportional to the supply voltage. The series circuit formed by the transistors 29 to 31, which has feedback through the inverter gate 36, and the capacitor 35 form a resonant circuit and generate oscillations which are shaped into rectangular-waveform signals by the inverter gate 37 and are fed via the output 38 to the frequency divider 22. A comparison of the curves 43 and 45, which illustrate the clock signals at the oscillator output 38 given supply voltages $V_{dd}$ of 5 volts and 3 volts, respectively, shows the approximately indirectly proportional relationship between the supply voltage $V_{dd}$ and the clock frequency at the oscillator output 38. The frequency divider 22 connected downstream of the Schmitt trigger oscillator 10 processes the signal present at the output 38 in such a way that the switching signal 3 consists of two rectangular-waveform signals which are present at the control outputs 6, 7 and thus at the pump inputs 8, 9 and are always mutually inverse. The pump circuit 2 processes the switching signal 3 present at the pump inputs 8, 9 to form a high voltage present at the high-voltage output 1. The curves 44 and 46 illustrate the increases, which are carried out in a packet-by-packet manner by the pump circuit 2 at half the frequency of the corresponding clock signal present at the oscillator output 38, in the high voltage which is present at the high-voltage output 1 and whose initial values are the respective supply voltages $V_{dd}$ of 5 volts and 3 volts. In both cases, the value of the high voltage present at the high-voltage output 1 is increased after 2 $\mu$s to approximately twice the value of the respective supply voltage $V_{dd}$ and, after a further 2 $\mu$s, to approximately three times the value of the respective supply voltage $V_{dd}$, which signifies a pump power which is virtually independent of the supply voltage $V_{dd}$.

I claim:

1. In combination with a load circuit and a voltage supply, a circuit configuration for supplying the load circuit with a high voltage having a value greater than a value of the voltage supply supplying the circuit configuration, the circuit configuration comprising:

a pump circuit having a high voltage output electrically connected to the load circuit for outputting a high voltage to the load circuit;

the voltage supply outputting a voltage with a value to said pump circuit;

an electronic control circuit connected to said pump circuit and receiving a voltage derived at least from the voltage supply; and a control signal derived in dependence on the value of the voltage supply received by said electronic control circuit, said electronic control circuit in dependence on said control signal emitting a switching signal having a pump frequency to said pump circuit for controlling a generation of said high voltage output by said pump circuit, a value of said pump frequency is inversely proportional to the value of the voltage supply.

2. The circuit configuration according to claim 1, wherein said pump circuit is controlled by said control signal received by said electronic control circuit for outputting an at least approximately constant pump power to the load circuit.

3. The circuit configuration according to claim 1, wherein said pump circuit has a pump power output controlled by said electronic control circuit and said pump power output is substantially proportional to a product of the value of the voltage supply and said pump frequency.

4. The circuit configuration according to claim 1, wherein said pump circuit has a pump power output controlled by said electronic control circuit as a function of the value of the voltage supply wherein said pump frequency is indirectly proportional to the value of the voltage supply.

5. The circuit configuration according to claim 1, wherein said electronic control circuit for generating and outputting said switching signal has an oscillator circuit with an input and an oscillator frequency, said input receiving said control signal for controlling said oscillator frequency.

6. The circuit configuration according to claim 5, wherein said control signal received at said input of said oscillator circuit is derived directly from the value of the voltage supply.

7. The circuit configuration according to claim 5, wherein said oscillator circuit has a Schmitt trigger circuit.

8. The circuit configuration according to claim 5, wherein said pump circuit ha, two inputs and said electronic control circuit has a frequency divider connected downstream of said oscillator circuit, said frequency divider outputting two mutually antisymmetric clock signals to said two inputs of said pump circuit.

9. The circuit configuration according to claim 8, wherein said pump circuit has a cascade circuit composed of a plurality of stages with capacitors and transistors operating as diodes, said plurality of stages connected in a series circuit between said high voltage output and the voltage supply, said transistors operating as diodes are connected in series with each other and have coupling points, said capacitors having ends remote from said transistors are coupled to said coupling points and are alternately coupled to said two inputs of said pump circuit by said ends remote from said transistors, said pump circuit has a further feedback transistor connected between the voltage supply and said series circuit composed of said transistors, and said further feedback transistor has a control input connected to the voltage supply and operates as a diode.

10. The circuit configuration according to claim 1, including a semiconductor substrate and said pump circuit and said electronic control circuit are formed in an integrated manner on said semiconductor substrate.

11. The circuit configuration according to claim 1, wherein said electronic load circuit has a group of memory cells forming a non-volatile electrically erasable and programmable semiconductor memory to be programmed and erased.

12. The circuit configuration according to claim 1, wherein said control signal has a value corresponding to the value of the supply voltage.

13. The circuit configuration according to claim 1, wherein said value of said high voltage is about +18 volts.

14. The circuit configuration according to claim 1, wherein said value of said high voltage is about −12 volts.

15. The circuit configuration according to claim 1, wherein the value of the voltage supply is between about +3 volts±10% and +5 volts±10%.

* * * * *